United States Patent
Gupta et al.

(10) Patent No.: US 7,353,498 B2
(45) Date of Patent: Apr. 1, 2008

(54) MULTI-PROCESS DEBUGGER

(75) Inventors: Poorva Gupta, Cupertino, CA (US); Venkatesh Radhakrishnan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 724 days.

(21) Appl. No.: 10/836,013

(22) Filed: Apr. 29, 2004

(65) Prior Publication Data

US 2005/0246688 A1   Nov. 3, 2005

(51) Int. Cl.
    *G06F 9/44* (2006.01)
(52) U.S. Cl. .................................. 717/125; 717/124
(58) Field of Classification Search ................ 717/124, 717/125
    See application file for complete search history.

(56) References Cited

U.S. PATENT DOCUMENTS

| | | | |
|---|---|---|---|
| 5,325,530 A * | 6/1994 | Mohrmann | 717/124 |
| 5,371,747 A * | 12/1994 | Brooks et al. | 714/38 |
| 5,533,192 A * | 7/1996 | Hawley et al. | 714/28 |
| 5,687,375 A * | 11/1997 | Schwiegelshohn | 717/129 |
| 6,516,460 B1 * | 2/2003 | Merks et al. | 717/124 |
| 6,988,264 B2 * | 1/2006 | Sarma et al. | 717/128 |
| 7,003,761 B2 * | 2/2006 | Tsurugasaki | 717/125 |
| 7,080,360 B2 * | 7/2006 | Bates et al. | 717/129 |
| 2004/0268317 A1 * | 12/2004 | Gouriou et al. | 717/130 |
| 2005/0071824 A1 * | 3/2005 | K. N. et al. | 717/138 |

OTHER PUBLICATIONS

"GDB: The GNU Project Debugger", pp. 1-2, Apr. 11, 2003, http://web.archive.org/web/20030411203034/http://www.gnu.org/software/gdb/.*

Sheng Yang Chiu, "Debugging Distributed Computations in a Nested Atomic Action System", Dec. 1984; http://www.Ics.mit.edu/publications/pubs/pdf/MIT-LCS-TR-327.pdf, pp. 1-4.*

* cited by examiner

*Primary Examiner*—Wei Zhen
*Assistant Examiner*—Chih-Ching Chow (57) ABSTRACT

A method of debugging a set of processes is disclosed. There is included providing a first debugger and forking the debugger, thereby creating a set of inner debuggers and an outer debugger. Each of the set of inner debuggers is configured to debug one of the set of processes. There is also included employing the outer debugger to interact with the set of inner debuggers to debug the set of processes.

20 Claims, 6 Drawing Sheets

```
If ((pid = fork() != 0)
    outer_debugger_code
else
    inner_debugger_code
```

MULTI-PROCESS DEBUGGER

BACKGROUND OF THE INVENTION

Debuggers have long been employed to detect errors during the execution of a computer program. Generally speaking, a debugger is typically employed during program development to allow the developer to step through the source code and to obtain information regarding variables and/or other information about the execution environment in order to assist the developer in pinpointing the source of errors.

In most modem operating systems, such as UNIX, Linux, Windows™ and the like, it is not unusual for multiple processes to be executed in parallel.

Consequently, there is a need for a debugger that can debug multiple processes executing concurrently. Examples of such approaches include, for example, products such as Ladebug™ by the Hewlett-Packard Company of Palo Alto, Calif. and Totalview™ by Etnus, LLC at Natick, Mass.

Figure 1:
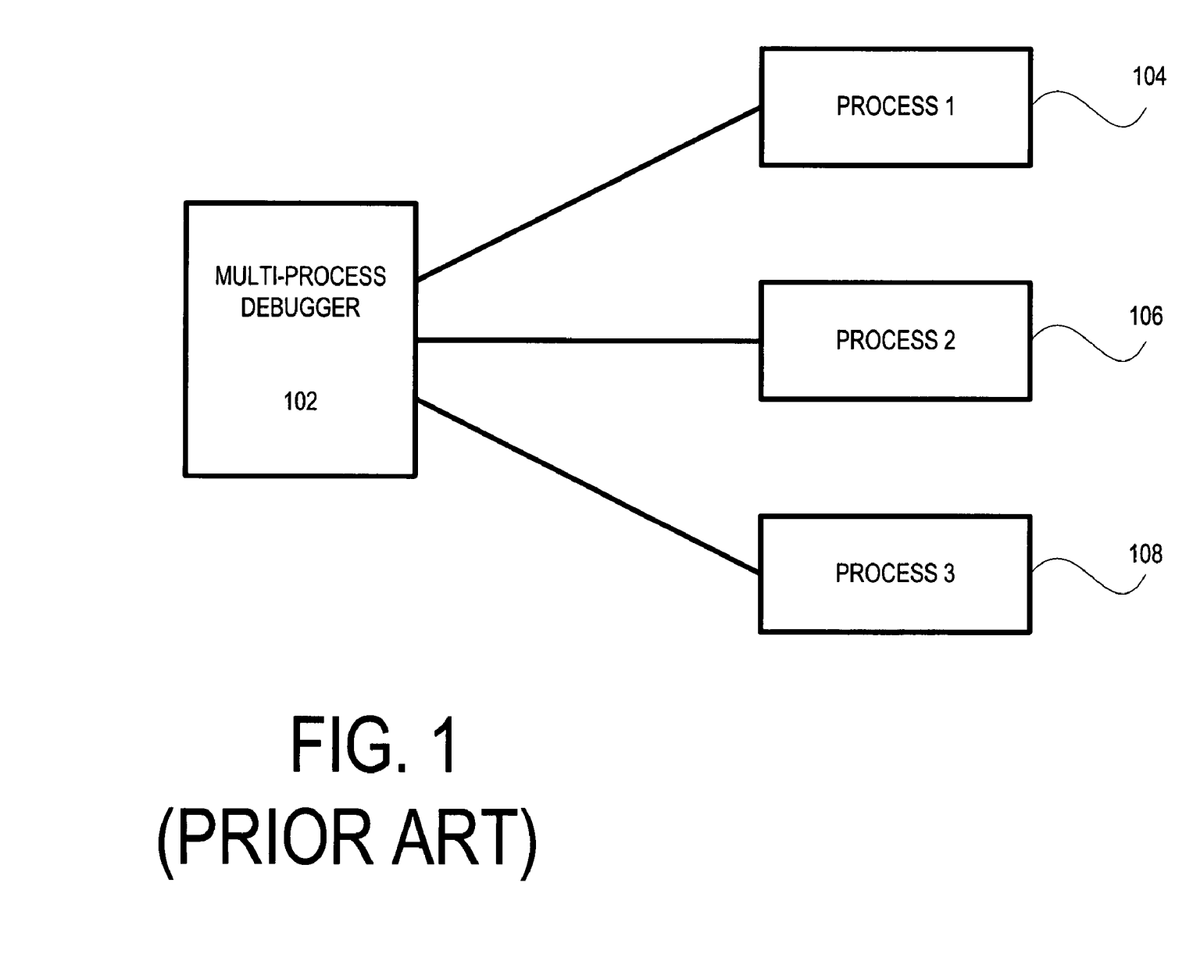
FIG. 1 illustrates a prior art multi-process debugger that may be employed to debug multiple processes executing concurrently in a computer system.

The single, integrated multi-process debugger is one approach that has been employed in the prior art. FIG. 1 illustrates one prior art multi-process debugger 102, which is employed to debug multiple processes 104, 106 and 108 executing concurrently on a computer system. Multi-process debugger 102 is typically a single integrated program, which is typically created from scratch for the purpose of debugging multiple concurrently executing processes.

It has been found, however, that the approach of FIG. 1 has certain disadvantages. For example, since multi-process debugger 102 is responsible for debugging multiple concurrently executing processes, multi-process debugger 102 tends to be a large, complicated program. Further, because multi-process debugger 102 is a single program executing as a single thread, it cannot fully take advantage of the parallelism offered by modem operating systems. As an example, multi-process debugger 102 is constrained by the inherent limit on space/memory associated with a single executing process.

Multi-process debugger 102 also tends to be unreliable in that if it encounters a problem while debugging one of the processes, e.g., process 104, multi-process debugger 102 may crash or halt execution, thereby impacting the debugging with respect to other processes, e.g., processes 106 and 108. As another example, if one of the processes being debugged, for example, process 104, requires a lot of attention in terms of signals or breakpoint hits, multi-process debugger 102 may not have sufficient resource left over to efficiently debug processes 106 and 108.

Figure 2:
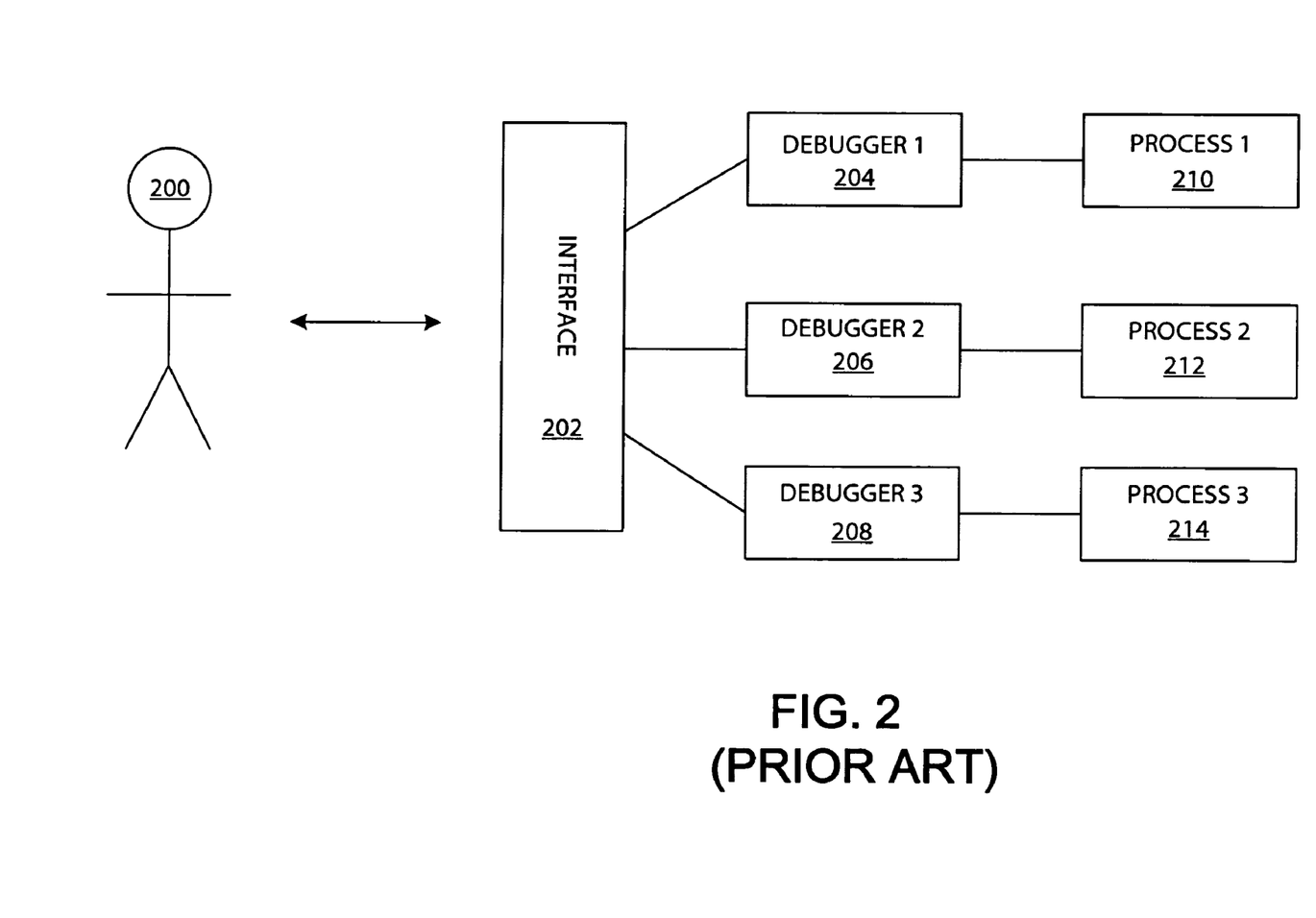
FIG. 2 shows another prior art approach wherein a user interface is employed to facilitate communication between a user and multiple debuggers.

FIG. 2 shows another approach wherein a user interface 202 is employed to facilitate communication between a user 200 and multiple debuggers 204, 206, and 208, each of which is responsible for debugging a respective process 210, 212, and 214. In the case of FIG. 2, debugger 204, 206, and 208 may represent different instantiations of the same debugger. User interface 202, which may represent either a graphical user interface or a command line interface, is typically created from scratch and includes control logic for interpreting commands from user 200 and formatting those commands into the appropriate format to send to one of the debuggers 204, 206, and 208. Further, user interface 202 also contains logic to parse outputs from debuggers 204, 206, and 208, and format the information received from the debuggers to transmit to user 200.

Although the arrangement of FIG. 2 can better take advantage of the parallelism offered by modem operating systems and processors, there remain disadvantages. For example, the logic required for performing the aforementioned interpreting, parsing, and formatting tends to be complex and thus require a substantial amount of time and effort to develop. Furthermore, the complexity of an additional piece of code that is external to the core of the various debuggers themselves poses a reliability risk to the overall debugging apparatus.

SUMMARY OF INVENTION

The invention relates, in an embodiment, to a method of debugging a set of processes. The method includes providing a first debugger and forking the debugger, thereby creating a set of inner debuggers and an outer debugger. Each inner debugger of the set of inner debuggers is configured to debug a process of the set of processes. The method also includes employing the outer debugger to interact with the set of inner debuggers to debug the set of processes.

In another embodiment, the invention relates to an arrangement in a computer system for debugging a set of processes. There is included an outer debugger and a set of inner debuggers. The outer debugger and the set of inner debuggers represent debuggers forked from a single debugger. Each inner debugger of the set of inner debuggers is configured to debug a process of a set of processes. The outer debugger is configured to facilitate communication between a user of the computer system and each inner debugger of the set of inner debuggers.

In yet another embodiment, the invention relates to an article of manufacture comprising a program storage medium having computer readable code embodied therein, the computer readable code being configured to debug a set of processes in a computer system. There is included a first set of code implementing a debugger. There is also included a second set of code associated with the debugger, the second set of code being configured to ascertain a process ID value returned when the debugger is forked by an operating system of the computer system. There is included a third set of code and a fourth set of code, the third set of code and the fourth set of code being activated in the alternative. The third set of code is activated in a parent instantiation of the debugger when the debugger is forked. The fourth set of code is activated in a child instantiation of the debugger when the debugger is forked.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with embodiments of the present invention, there are provided methods and structures for extending the capability of a single process debugger to allow that single process debugger to debug multiple processes while taking advantage of the parallelism capability of modern operating systems.

In an embodiment, additional intelligence and/or code is built into the debugger code beyond what is required for a single-process debugger. Firstly, a debugger in the present invention is provided, in an embodiment, with logic to determine whether it is acting in the capacity of an outer debugger or an inner debugger. Furthermore, there is provided code to allow a debugger process, when acting in the capacity of an outer debugger, to track its inner debuggers and the processes being debugged by those inner debuggers. Furthermore, there is provided code to allow a debugger process, when acting in the capacity of an outer debugger, to track the state of the debugging processes for the target processes.

Further, there is provided code to allow a debugger process, when acting in the capacity of an outer debugger, to switch communication context among the various inner debuggers to which it is communicating. The switching may be performed in a command-oriented manner (e.g., the user may specify via a command which inner debugger the user wishes to communicate with) or using a graphical user interface (e.g., the user may specify via a drop-down menu or may simply alternate, while using the outer debugger, among different control panels, each of which is employed to facilitate communication with an inner debugger). In this manner, the outer debugger acts as a traffic controller to direct traffic between the user and the various inner debuggers.

Embodiments of the invention leverage on the forking ability of the operating system, which forking ability creates a set of child processes (i.e., one or more child processes) from a parent process and automatically sets up communication channels between the parent process and the child process(es). The parent process or parent debugger is referred to herein as the outer debugger and the child processes that are forked from the outer debugger may be thought of as inner debuggers. Each inner debugger is a separate process, executing as a separate entity and is responsible for debugging its own target process (i.e., the process being debugged).

Because the inner debuggers are forked from the outer debugger, they all have the same code, generally speaking. In other words, each instance of the debugger (whether parent or child after forking) has both the code that enables it to function as an outer debugger and the code that enables it to function as an inner debugger. Which set of code is executed depends on which role a debugger instance takes on. If a debugger instance assumes the outer debugger role, the code that enables it to function as an outer debugger is executed. If a debugger instance assumes the inner debugger role, the code that enables it to function as an inner debugger is executed. Since the outer debugger is a debugger itself, it can also debug a target process, if desired.

Furthermore, since the outer debugger is already a debugger (i.e., it is created via the forking process from a debugger), the outer debugger already possesses the facility for interpreting/parsing/formatting the information (such as any debugging command or data) communicated between a user and its own internal debugging engine. Note that this is a facility that is inherently present within any debugger. When acting as an outer debugger, the same facility in the outer debugger is employed, albeit to facilitate communication between the user and the set of inner debuggers so that the task of interpreting/parsing/formatting is offloaded, either partially or wholly, from the inner debuggers.

The task of interpreting/parsing/formatting may also be done at the inner debuggers since each of the inner debuggers is, itself, a debugger forked from the outer debugger. Irrespective of whether the interpreting/parsing/formatting is done at the outer debugger or in the inner debugger, it should be appreciated from the foregoing that no additional, external logic needs to be custom-created to interpret/parse/format information between the inner debuggers and the outer debugger or to coordinate communication between these debuggers.

Generally speaking, the parent process sets up the communication pipe(s) in advance of forking. When a process forks, a parent process and a child process are created (the original process becomes the parent process, in one implementation). As is known in Unix implementations, processes created via forking can communicate via pipes, which are essentially communication channels between two processes. The concepts of forking and pipes are well known to those familiar with Unix and operating systems in general.

Since the parent process and the child process share the same code and data in their respective code spaces and data spaces immediately upon forking, the child process inherits the communication pipe set up by the parent process and communication between the parent process and the child process can be accomplished thereby. Subsequently, the data space of the child process may change but the communication between the parent process and the child process can continue via the communication pipe already set up.

To a user working with the outer debugger, the debugging interface does not change when the user switches context among the various inner debuggers. That is, the information appears to the user as if the user is working with a single process debugger. The content of the data presented to the user and received from the user to be transmitted onward to the inner debugger depends on the communication context, i.e., which inner debugger currently talks to the outer debugger.

When a debugger process acts as an inner debugger, the portion of code pertaining to outer debugger functions is not activated. Furthermore, the debugger process acting in the inner debugger capacity knows that it takes inputs from the outer debugger, and that it outputs data to the outer debugger, which then relays the data to the user.

Figure 3:
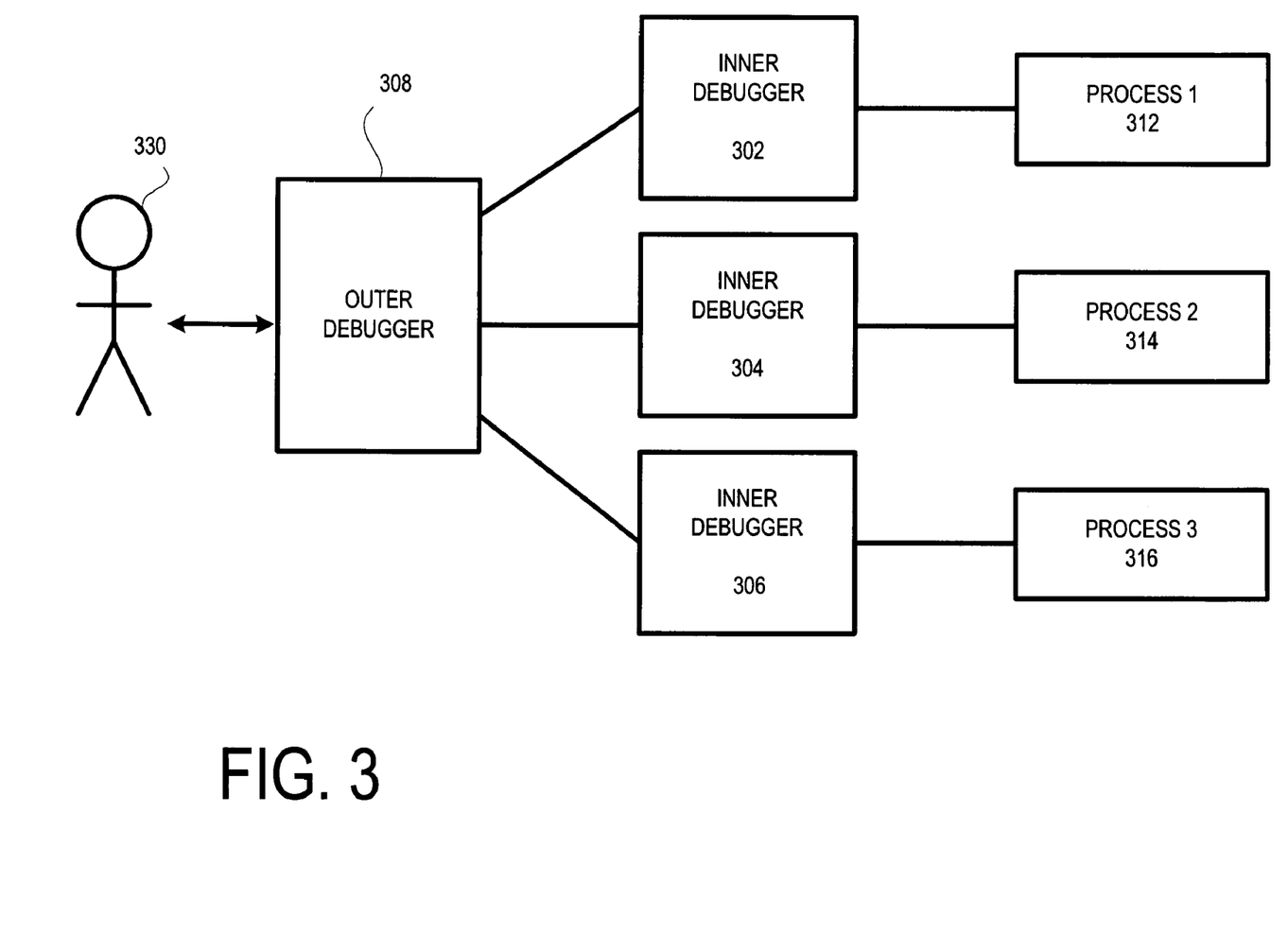
FIG. 3 shows, in accordance with an embodiment of the present invention, a simplified diagram of the multi-process debugging arrangement created by forking a single process debugger.

The features and advantages of the invention may be better understood with reference to the figures and drawings that follow. FIG. 3 shows, in accordance with an embodiment of the present invention, a simplified diagram of the multi-process debugging arrangement created by forking a single process debugger. As shown in FIG. 3, three inner debuggers 302, 304, and 306 are forked from a debugger 308. Since these inner debuggers 302, 304, and 306 are forked from debugger 308, debugger 308 is the outer debugger.

Each of inner debuggers 302, 304, and 306 is shown debugging a respective target process 312, 314, and 316. Although only three inner debuggers are shown, any number of inner debuggers may be forked. Furthermore, an inner debugger may fork inner debuggers of its own. Thus, an inner debugger may become an outer debugger, and the debugging arrangement may assume a tree-like structure.

Because inner debuggers 302, 304, and 306 are set up using the forking facility of the operating system, the communication channels between outer debugger 308 and each of the inner debuggers will be already automatically set up by outer debugger 308. Via outer debugger 308, user 330 can switch communication context (i.e., communicate alternately with each of the inner debuggers) and communicate with each of inner debuggers 302, 304, or 306. The communication context framework also allows each inner debugger to communicate with user 330 via outer debugger 308.

As mentioned, the facility for parsing/interpreting/formatting the information that is transmitted between user 330 and the inner debuggers exists in both the outer debugger and each inner debugger, since they are all instances of the same debugger program. Accordingly, this task of interpreting/parsing/formatting information can be performed either at outer debugger 308 or at individual inner debuggers. Since outer debugger 308 itself is a debugger, it can also have its own target process to debug.

Since each of these debuggers (whether outer or inner) is a separate executing thread, the entire debugging arrangement is not subject to the limitation on the amount of memory space and/or other resources that would be imposed on a single executing thread, as would be the case with the prior art debugger of FIG. 1. That is, the multi-process debugging arrangement of FIG. 3 can better take advantage of the parallelism offered by modern operating systems and processors.

In an embodiment, the debugger can communicate with a target process using the UNIX ttrace system call.

As mentioned, the debugger is provided with the capability to determine whether it is executing in the capacity of an outer debugger or an inner debugger. In the UNIX environment, this is accomplished by, in an embodiment, examining the process ID (PID) that is returned after the fork call is performed on a parent process.

Figure 4:
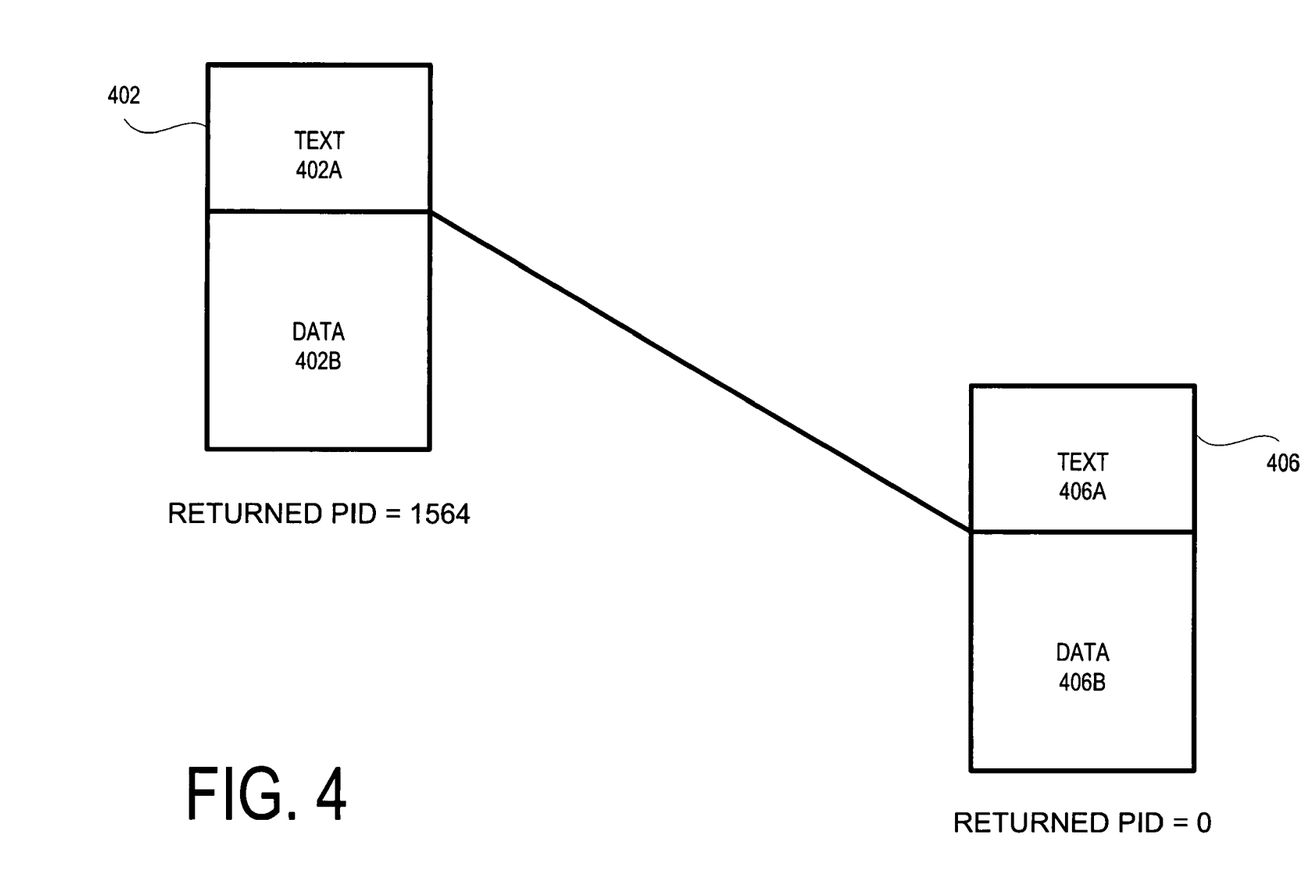
FIG. 4 shows a parent process and a child process.

FIG. 4 is a simplified illustration to facilitate discussion of this aspect in accordance with an embodiment of the invention. In FIG. 4, a parent process 402 has a text portion 402*a* and data portion 402*b*. When a fork call is made with respect to process 402, child process 406 is created. Since process 406 is forked from parent process 402, it contains identical text (code) and data as parent process 402 immediately after the forking system call completes.

As a result of the fork call, the operating system returns a process ID signifying that process 406 is a child process. The returned process ID signifying that the recipient process is a child process is zero in some Unix implementations. The operating system returns a value 1564 for the process ID (PID) associated with process 402, signifying that process 402 is a parent process. The value 1564 is an arbitrary value that is picked for illustration purposes and represents the process ID of the child process being forked, i.e., the process ID of child process 406. By examining the PID returned from the fork system call, a debugger can determine whether it is an outer debugger or an inner debugger by ascertaining whether or not the value of its returned PID parameter is non-zero (outer) or zero (inner).

Figure 5:
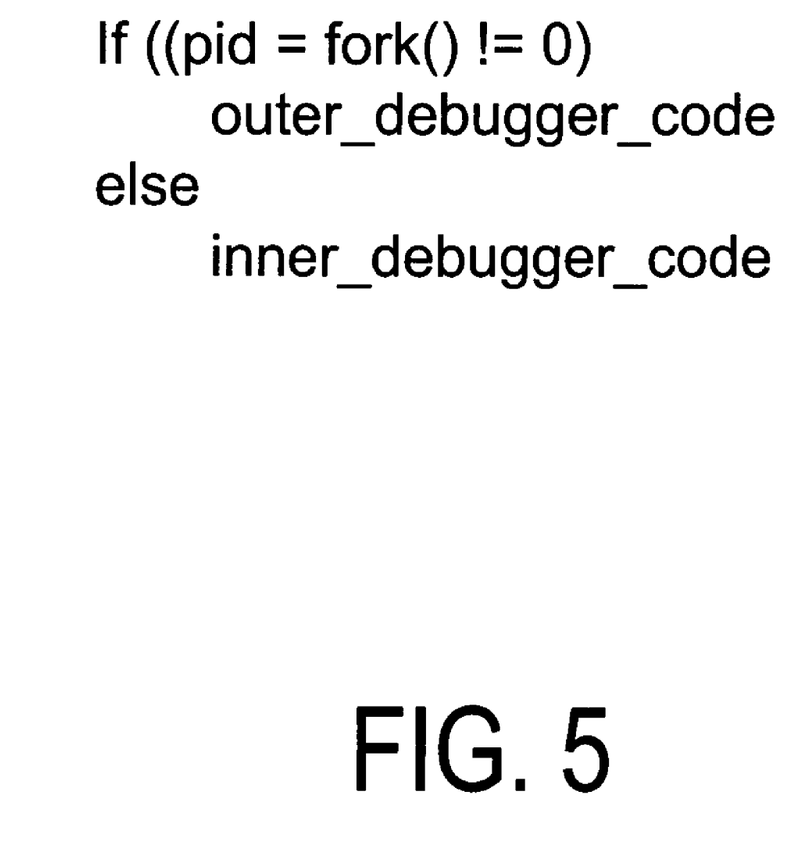
FIG. 5 shows, in accordance with an embodiment of the invention, exemplary pseudo-code within the debugger for making the determination whether the outer debugger code or the inner debugger code should execute.

FIG. 5 shows, in accordance with an embodiment of the invention, exemplary pseudo-code within the debugger for making this determination, which results in either the execution of the outer debugger code or the execution of the inner debugger code.

Figure 6A:
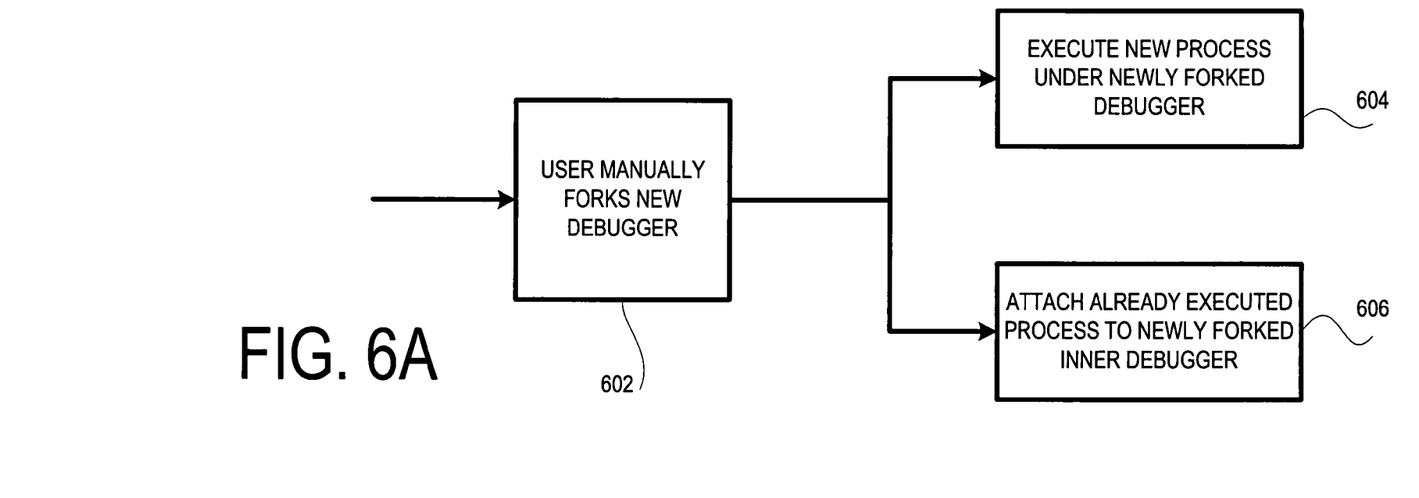
FIGS. 6A and 6B are simplified diagrams showing, in accordance with embodiments of the invention, various scenarios for debugging a target process by an inner debugger of the multi-process debugging arrangement.
Figure 6B:
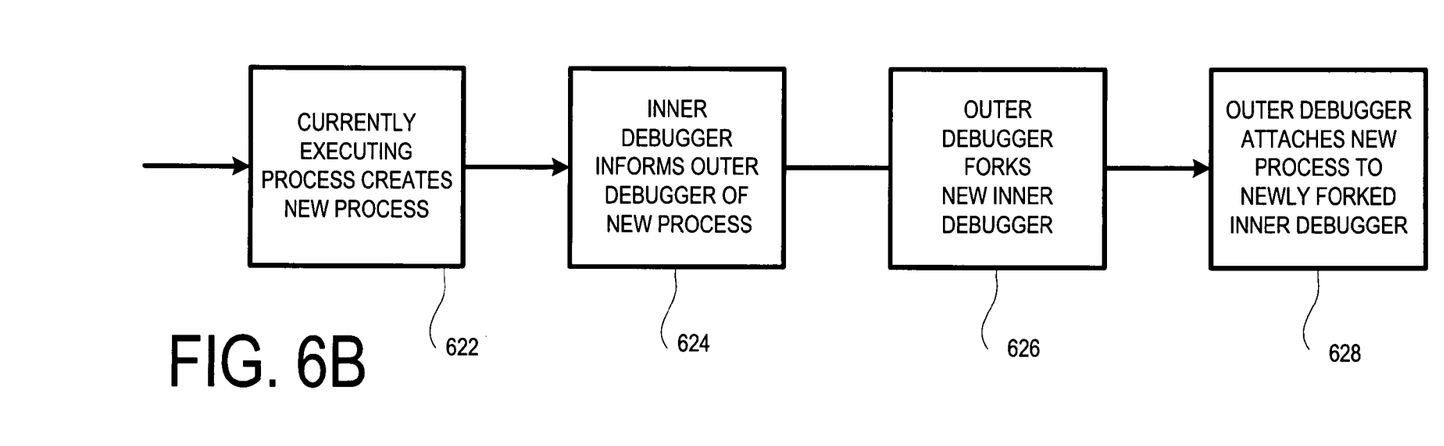

FIGS. 6A and 6B are simplified diagrams showing various scenarios for debugging a target process by an inner debugger of the multi-process debugging arrangement. Generally speaking, the debugging of a target process may commence automatically or by manual user specification.

FIG. 6A shows, in an embodiment, the situation where the user manually forks a new inner debugger. In step 602, the user may specify, while operating via the outer debugger, a command in order to fork an inner debugger. In the debugger gdb (available from the Hewlett-Packard Company of Palo Alto, Calif.), this command may be, for example, file.

The format of the file command may be, for example, file program_1, wherein program_1 is name of the target process that the child debugger needs to debug. Thereafter, the user may issue a command to execute the newly forked debugger (step 604). In gdb, this command may be, for example, run. Step 604 is typically performed to debug a process that has not been executing at the time that the new inner debugger is forked.

If the process to be debugged is already executing, the user may elect to attach the already executed process to the newly forked inner debugger (606). The gdb command format for such attachment may take the form of, for example, attach 1234 wherein 1234 represents the process ID for the target process to be debugged.

The debugging process may also start automatically. An example of this case is depicted in FIG. 6B, in an embodiment, in which a currently executing process creates a new process (622). In this case, the inner debugger that is debugging the currently executing process would notify the outer debugger of the creation and the identification of the newly created process to be debugged (624). The outer debugger then automatically forks a new inner debugger (626). Thereafter, the outer debugger would automatically attach the newly created process to the newly forked debugger (628).

The number of inner debuggers may also be reduced manually or automatically as the debugging session proceeds. In the manual reduction case, the user may specify via the outer debugger that debugging of a particular target process via an inner debugger be terminated. In the automatic case, the execution of a process may be concluded or may terminate in some state and the inner debugger, therefore, may cease to debug and, thus, be removed from the multi-process debugging arrangement.

In the examples of FIGS. 6A and 6B, the single process debugger gdb executing under UNIX is employed as the example debugger although, as mentioned earlier, the invention is not limited to any particular single process debugger or to the UNIX operating system (i.e., it also works with other operating systems capable of forking processes such as Linux or Windows™).

As mentioned, there is provided code to allow a debugger process, when acting in the capacity of an outer debugger, to track its inner debuggers and the processes being debugged by those inner debuggers. Such tracking may include, for example, keeping tab of how many inner debuggers are currently executing and which inner debugger is debugging which process. Furthermore, there is provided code to allow a debugger process, when acting in the capacity of an outer debugger, to track the state of the debugging processes for the target processes. Such tracking may include, for example, keeping tab of the performance of the inner debuggers and being aware whether an inner debugger has crashed.

As can be appreciated from the foregoing, various embodiments of the invention allow a single process debugger to be expanded into a multi-process debugging arrangement using the already existing forking facility of the operating system. No code external to the debuggers themselves needs to be created. Thus, embodiments of the invention differ from the arrangement of FIG. 2 wherein a custom-crafted user interface 202 is required to interpret/parse/format information and to coordinate among the various debuggers.

Reliability is also improved since embodiments of the invention rely on the well-tested forking facility of the operating system as well as the single process debugger as starting points. Set-up is simplified because debuggers are forked and/or removed automatically as needed. The communication channels between the outer debugger and the inner debuggers are also automatically set up by the forking facility of the operating system, thereby substantially reducing the amount of effort required to create the multi-process debugging arrangement.

Furthermore, since each debugger (outer or inner) is a separate process, the multi-process debugging arrangement can take advantage of the parallelism offered by the operating system in the processor or processors of the computer system. Since the outer debugger itself is a debugger, the user simply interfaces with the outer debugger using the already known single-debugger interface and, depending on the communication context, can communicate with each specific inner debugger in turn. Advantageously, the user interface stays the same, and no learning curve is required to learn a new user interface as in the case with the prior art.

Listing 1 shows, in an embodiment of the present invention, exemplary gdb code for implementing a multi-process debugger.

In the following listing, major changes to facilitate an implementation of the multi-process debugger, in the context of gdb on HP-UX (an operating system available from The Hewlett-Packard Company of Palo Alto, Calif.), are outlined. The filenames are listed, followed by a brief outline of the changes made to the file. Minor details are not discussed in detail as they can be readily ascertained by those skilled in the art given this disclosure.

event-top.c: In this file, the output is flushed, thereby enabling the communication between the outer and inner debugger to go through. The signal SIGUSR1 is used to communicate between the outer gdb and inner gdbs event-top.h: The processing of signal SIGUSR1 is performed here.

infcmd.c:
   A new command attach_process command is added—this is an extension of the attach command.

The attach command takes a program that is started up outside of gdb and "attaches" to it. This stops the program and permits debugging to commence. Thereafter, wait for the trace-trap that results from attaching.

In the case of the multi process debugger, a pipe is opened in the attach_process command.

Forking is then performed.

In the child debugger process, the following is performed:
     (1) Close stdin/stdout
     (2) Dup the child's read end to stdin
     (3) Dup the child's write end to stdout
     (4) Copy the parent gdb's arguments
     (5) exec a new gdb with the arguments of the outer gdb along with the arguments from the attach process command    In the parent debugger process, the following is performed:
     (1) Keep track of the pipe used for communicating with child
     (2) Keep track of child gdb's pid
     (3) Create prompt for child    Correspondingly, a new command detach_process command is added, which in turn is an extension of the detach command. The detach command takes a program previously attached to and detaches it.

In the case of the multiprocess debugger, in the detach_process command, a detach command is sent to the inner gdb. The output is flushed and the pipe is then closed.

inferior.h: An end marker is added to facilitate communication and add new commands are added main.c: Data structures for parent to keep track of child process ids, pipes, program names thread.c: Processes are treated similar to threads.
   A new command called process command, which is similar to the thread command is added.:
     If no argument, this process command gives the list of pids and names of processes available to be debugged
     if invalid argument, gives an error message
     if process with that number exists, communicates with the
       inner debugger for this process using the pipe
       sends commands and receives output from this inner debugger
     process apply command can apply commands to all/subset of debugged processes
   info process command gives list of processes: similar to info thread top.c:
   The routine execute_command in outer gdb's is modified to deal with inner gdb's and
   send and receive i/o from inner gdbs
   added process, attach_process, detach process, info process
   commands in the outer gdb
   Modified prompt to indicate process being debugged Listing 1.

While this invention has been described in terms of several embodiments, there are alterations, permutations, and equivalents which fall within the scope of this invention. For example, the invention covers not only the methods, techniques, and arrangements as discussed but also articles of manufacture comprising program storage medium having thereon computer readable code for performing the inventive methods and techniques. An example of such an article of manufacture may be, for example, a computer system, a computer sub-system, or a magnetic, opto-electrical or optical storage device (either removable or non-removable). It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer system, a method of debugging a set of processes, comprising:
   providing a first debugger;
   forking said first debugger, thereby creating a set of inner debuggers and an outer debugger, wherein the set of inner debuggers are forked from the outer debugger, each inner debugger of said set of inner debuggers being configured to debug a respective process of said set of processes, wherein each inner debugger debugs a respective single process, wherein said first debugger includes a first set of code and a second set of code, said first set of code and said second set of code being activated in the alternative, said first set of code being activated in said outer debugger, said second set of code being activated in said set of inner debuggers;
   ascertaining a process ID value returned from said forking, said process ID value determines whether said first set of code or said second set of code be activated;
   employing said outer debugger to interact with said set of inner debuggers wherein the inner debuggers debug said set of processes; and
   forking a first inner debugger of said set of inner debuggers, thereby creating a second inner debugger.

2. The method of claim 1 wherein said forking is performed using a forking facility furnished by an operating system in said computer system.

3. The method of claim 2 wherein said operating system represents a Linux operating system.

4. The method of claim 2 wherein said operating system represents a UNIX operating system.

5. The method of claim 2 wherein said operating system represents a Windows operating system.

6. The method of claim 1 wherein said first set of code includes code for tracking said set of inner debuggers and said set of processes.

7. The method of claim 1 wherein said first set of code includes code for allowing a user to switch context to interact with each of said set of inner debuggers.

8. The method of claim 1 wherein said second set of code includes code for receiving inputs from a user of said computer system through said outer debugger during said debugging.

9. In a computer system, an arrangement for debugging a set of processes, comprising:
   a processor;
   an outer debugger; and
   a set of inner debuggers, said outer debugger and said set of inner debuggers representing debuggers forked from a single debugger, wherein said processor executes said single debugger, each inner debugger of said set of inner debuggers being configured to debug a respective process of a set of processes so that each inner debugger debugs a respective single process, said outer debugger being configured to facilitate communication between a user of said computer system and said each inner debugger of said set of inner debuggers; and
   a second inner debugger forked from an inner debugger of said set of inner debuggers:
   wherein said single debugger includes a first set of code and a second set of code, said first set of code and said second set of code being activated in the alternative, said first set of code being activated in said outer debugger, said second set of code being activated in said set of inner debuggers.

10. The arrangement of claim 9 wherein said outer debugger and said set of inner debuggers are forked using a forking facility furnished by an operating system of said computer system.

11. The arrangement of claim 10 wherein said operating system represents a Linux operating system.

12. The arrangement of claim 10 wherein said operating system represents a UNIX operating system.

13. The arrangement of claim 10 wherein said operating system represents a Windows operating system.

14. The arrangement of claim 9 wherein said first set of code includes code for tracking said set of inner debuggers and said set of processes.

15. The arrangement of claim 9 wherein said first set of code includes code for allowing a user to switch context to interact with each of said set of inner debuggers.

16. The arrangement of claim 9 wherein said second set of code includes code for receiving inputs from a user of said computer system through said outer debugger during said debugging.

17. An article of manufacture comprising a program storage medium having computer readable code embodied therein, said computer readable code being configured to debug a set of processes in a computer system, comprising:
   a first set of code implementing a debugger;
   a second set of code associated with said debugger, said second set of code being configured to ascertain a process ID value returned when said debugger is forked by an operating system of said computer system;
   a third set of code and a fourth set of code, said third set of code and said fourth set of code being activated in the alternative, said third set of code being activated in a parent instantiation of said debugger when said debugger is forked, said fourth set of code being activated in a child instantiation of said debugger when said debugger is forked, wherein the child instantiation is forked from the parent instantiation and wherein the process ID value identifies an instantiation of said debugger as either a parent instantiation or a child instantiation.

18. The method of claim 17 wherein said first set of code includes code for tracking child instantiations forked from said debugger.

19. The method of claim 18 wherein said first set of code includes code for allowing a user to switch context to interact with said child instantiations.

20. The method of claim 17 wherein said second set of code includes code for receiving inputs from a user of said computer system through said parent instantiation during debugging, said inputs being destined for said child instantiation.

* * * * *

UNITED STATES PATENT AND TRADEMARK OFFICE
CERTIFICATE OF CORRECTION

PATENT NO. : 7,353,498 B2 Page 1 of 1
APPLICATION NO. : 10/836013
DATED : April 1, 2008
INVENTOR(S) : Poorva Gupta et al.

It is certified that error appears in the above-identified patent and that said Letters Patent is hereby corrected as shown below:

In column 1, line 13, delete "modem" and insert -- modern --, therefor.

In column 1, line 36, delete "modem" and insert -- modern --, therefor.

In column 1, line 66, delete "modem" and insert -- modern --, therefor.

In column 10, line 5, in Claim 9, after "debuggers" delete ":" and insert -- ; --, therefor.

Signed and Sealed this

Fifth Day of August, 2008

JON W. DUDAS
*Director of the United States Patent and Trademark Office*